(12) United States Patent
Jung et al.

(10) Patent No.: US 8,121,009 B2
(45) Date of Patent: Feb. 21, 2012

(54) APPARATUS AND METHOD FOR RECORDING DATA ON HOLOGRAPHIC STORAGE MEDIUM

(75) Inventors: Moon-Il Jung, Suwon-si (KR); Jong-Chul Choi, Suwon-si (KR); Taek-Seong Jeong, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 137 days.

(21) Appl. No.: 12/528,163

(22) PCT Filed: Aug. 28, 2007

(86) PCT No.: PCT/KR2007/004117
§ 371 (c)(1),
(2), (4) Date: Oct. 19, 2009

(87) PCT Pub. No.: WO2008/102939
PCT Pub. Date: Aug. 28, 2008

(65) Prior Publication Data
US 2010/0118682 A1  May 13, 2010

(30) Foreign Application Priority Data
Feb. 22, 2007 (KR) .......................... 10-2007-0018091

(51) Int. Cl.
*G11B 7/00* (2006.01)

(52) U.S. Cl. .................................. 369/103; 369/124.04
(58) Field of Classification Search .................. None
See application file for complete search history.

(56) References Cited

U.S. PATENT DOCUMENTS

| | | | |
|---|---|---|---|
| 6,256,281 B1 * | 7/2001 | Tanaka et al. | 369/103 |
| 7,843,791 B2 * | 11/2010 | Kwon et al. | 369/103 |
| 2005/0007930 A1 | 1/2005 | Horimai et al. | |
| 2005/0176947 A1 | 8/2005 | An et al. | |
| 2006/0203689 A1 * | 9/2006 | Kanaoka et al. | 369/103 |
| 2007/0081206 A1 * | 4/2007 | Tsukagoshi et al. | 359/2 |
| 2008/0151338 A1 * | 6/2008 | Bates et al. | 359/9 |

FOREIGN PATENT DOCUMENTS

KR 2007-16478 2/2007

* cited by examiner

*Primary Examiner* — Paul Huber
(74) *Attorney, Agent, or Firm* — NSIP Law

(57) ABSTRACT

An apparatus and method to record data on a holographic storage medium, the apparatus including: a light processing unit to record the data on the holographic storage medium using a reference beam and a signal beam, the light processing unit including a light modulator to modulate the signal beam; and a control unit to control the light processing unit to record the data on the holographic storage medium, wherein the light modulator modulates the signal beam so that an image formed on a surface of the light modulator is shorter in a radial direction that is a scanning direction of the reference beam than in a tangential direction that is perpendicular to the radial direction.

19 Claims, 6 Drawing Sheets

FIG. 1A  FIG. 1B
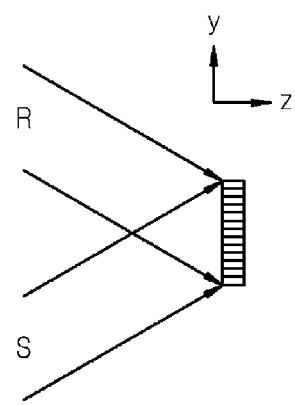
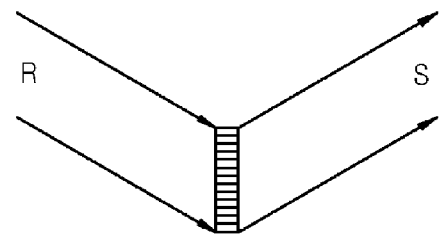
FIG. 2
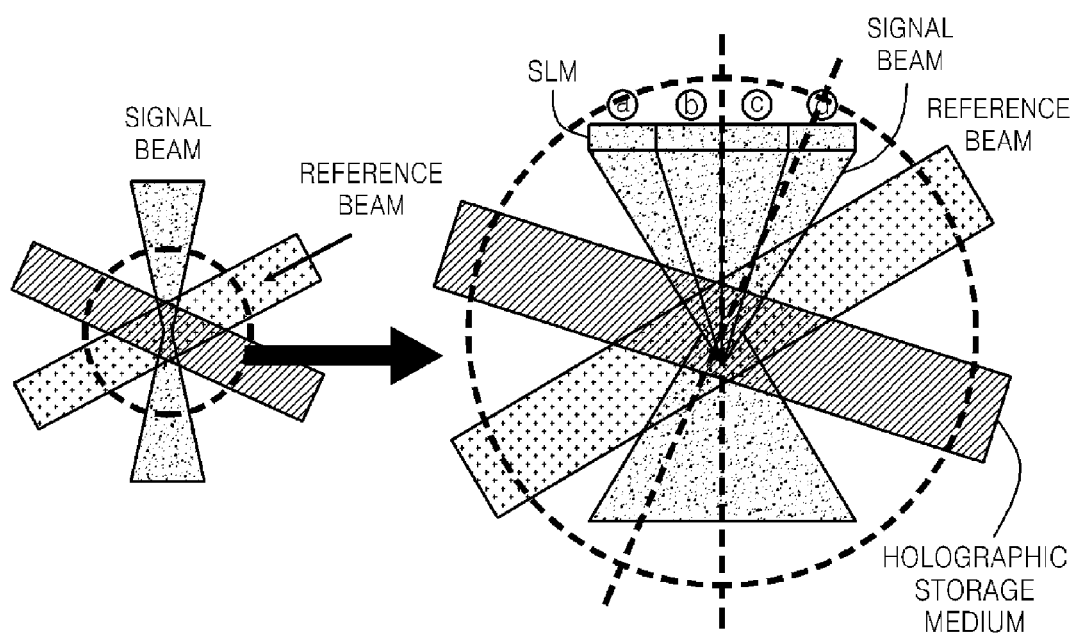

APPARATUS AND METHOD FOR RECORDING DATA ON HOLOGRAPHIC STORAGE MEDIUM

CROSS-REFERENCE TO RELATED APPLICATIONS

This application is a national stage application of PCT International Patent Application No. PCT/KR2007/004117, filed Aug. 28, 2007, and claims the benefit of Korean Patent Application No. 10-2007-0018091, filed Feb. 22, 2007, in the Korean Intellectual Property Office, the disclosures of which are incorporated herein by reference.

BACKGROUND OF THE INVENTION

1. Field

Aspects of the present invention relate to an apparatus and method for recording data on a holographic storage medium.

2. Description of the Related Art

Optical holography stores data using the volume of a recording medium, as opposed to the surface of the recording medium. During a recording mode, a signal beam interferes with a reference beam on the recording medium to produce an interference grating called a data page. In a multiplexing scheme, the optical characteristic of the reference beam is changed while a plurality of interference gratings are superposed. During a reproduction mode, a reference beam is incident on the recording medium under the same condition as for recording data to produce diffracted light representing the stored data page. The diffracted light is detected by a detector array that extracts data bits stored from a measured intensity pattern. The data page contains a number of data bits or pixels. Accordingly, a data storage capacity of the recording medium can be increased by superposing a plurality of data pages in the same volume.

A hologram is recorded using a reference beam and a signal beam containing data. FIGS. 1A and 1B are diagrams to explain recording and reproduction modes in optical holography. Referring to FIG. 1A, during a recording mode, a reference beam R and a signal beam S interfere with each other to produce an interference pattern and send the interference pattern to a medium. Referring to FIG. 1B, during a reproduction mode, the reference beam R is emitted to a hologram recorded on the medium to cause diffraction from the recorded hologram such that the signal beam S is reproduced and output. If the reference beam used for reproducing is different from the reference beam used for recording, the intensity and direction of the reproduced signal beam are different from those of the original signal beam recorded on the medium. In general, when the difference increases, the light intensity decreases in the form of a sinc function.

FIG. 2 is a diagram illustrating the angle of a signal beam according to each region when data is recorded on a holographic storage medium. Referring to FIG. 2, a signal beam and a reference beam are incident on the holographic storage medium. The signal beam is modulated by a light modulator (e.g., spatial light modulator (SLM)), and concentrated on a holographic storage medium in the form of a page. The SLM is a membrane device such that the angle of the signal beam incident on the holographic storage medium varies according to each region of the SLM. When the region of the SLM is divided into regions a, b, c, and d in a scanning direction, as shown in FIG. 2, the incident angle and selectivity of the signal beam at each region are shown in Table 1.

TABLE 1

|  | Region a | Region b | Region c | Region d |
|---|---|---|---|---|
| Incident angle of signal beam (°) | 35.86 | 28.62 | 21.38 | 14.14 |
| Selectivity (°) | 0.11 | 0.12 | 0.14 | 0.16 |

The angle of the signal beam incident on the holographic storage medium, which is the angle of the signal beam to a normal line of the holographic storage medium, is 35.86° at the region a, 28.62° at the region b, 21.38° at the region c, and 14.14° at the region d of the SLM. Each of the regions has an angle deviation of about 7.24° since the signal beam passes through an objective lens having a numerical aperture (NA), which concentrates the signal beam, before entering the holographic storage medium. In general, incident light is refracted outwardly unless the light is incident within a certain angle from a central axis. The NA of the objective lens is the sine of the maximum angle of incident light that is totally reflected and transmitted in the lens without being refracted outwardly. The NA is found from the calculation of the selectivity of the signal beam at each region that a smaller angle results in higher selectivity. That is, the selectivity of the signal beam varies according to each region of the SLM, and a higher selectivity is preferred to prevent crosstalk. However, as selectivity increases, an angular separation of each hologram increases, thereby making it difficult to achieve high density multiplexing of the holographic storage medium.

FIG. 3 is a diagram illustrating the region of a page, which is a signal beam modulated by an SLM, divided into regions A, B, C, and D in a scanning direction of a reference beam. FIG. 4 is a graph illustrating the selectivity of the signal beam according to each region of the page of FIG. 3. The selectivity varies according to each region, like in Table 1 of FIG. 2. Since the maximum selectivity should be selected, it is difficult to achieve high density data recording.

SUMMARY OF THE INVENTION

Aspects of the present invention provide an apparatus and method for recording data on a holographic storage medium at high density.

Aspects of the present invention provide an apparatus and method to record data on a holographic storage medium at high density. According to an aspect of the present invention, a deviation of the incident angle of a signal beam in a direction in which a reference beam is incident can be reduced and thus data can be recorded at a high density. Furthermore, the high density data recording can lead to a high recording capacity and a high signal quality of the holographic storage medium.

According to an aspect of the present invention, there is provided an apparatus for recording data on a holographic storage medium, the apparatus comprising: a light processing unit comprising the holographic storage medium and a light modulator, and recording data on the holographic storage medium using a reference beam and a signal beam modulated by the light modulator; and a control unit controlling the light processing unit to record the data on the holographic storage medium, wherein the light modulator is arranged so that an image formed on a surface of the light modulator is shorter in a radial direction that is a scanning direction of the reference beam than in a tangential direction that is perpendicular to the radial direction.

The light modulator may be a rectangular spatial light modulator (SLM).

According to another aspect of the present invention, there is provided an apparatus for recording data on a holographic storage medium, the apparatus comprising: a light processing unit recording data on the holographic storage medium using a modulated signal beam and a reference beam; and a control unit controlling the light processing unit to record the data on the holographic storage medium, wherein the light processing unit records the data so that the angle of the modulated signal beam incident on the holographic storage medium is smaller in a radial direction, which is a scanning direction of the reference beam, than in a tangential direction perpendicular to the radial direction.

The apparatus may further comprise a variable shutter blocking the signal beam traveling from edges in the radial direction.

According to another aspect of the present invention, there is provided a method of recording data on a holographic storage medium, the method comprising: receiving a signal beam, and modulating the signal beam so that an image to be output is shorter in a radial direction that is a scanning direction of a reference beam than in a tangential direction that is perpendicular to the radial direction; and recording data on the holographic storage medium using the modulated signal beam and the reference beam.

The modulating of the signal beam may comprise modulating the signal beam using a rectangular spatial light modulator (SLM).

According to another aspect of the present invention, there is provided a method of recording data on a holographic storage medium, the method comprising: concentrating a modulated signal beam so that the angle of the modulated signal beam incident on the holographic storage medium is smaller in a radial direction, which is a scanning direction of a reference beam, than in a tangential direction perpendicular to the radial direction; and recording data on the holographic storage medium using the concentrated signal beam and the reference beam.

The concentrating of the modulated signal beam may comprise; concentrating the modulated signal beam so that the angle of the signal beam is smaller in the radial direction than in the tangential direction by blocking parts of the modulated signal beam traveling from edges in the radial direction.

According to another aspect of the present invention, there is provided a computer-readable recording medium having embodied thereon a computer program for a method of recording data on a holographic storage medium, wherein the method comprises: receiving a signal beam, and modulating the signal beam so that an image to be output is shorter in a radial direction that is a scanning direction of a reference beam than in a tangential direction that is perpendicular to the radial direction; and recording data on the holographic storage medium using the modulated signal beam and the reference beam.

According to another aspect of the present invention, there is provided a computer-readable recording medium having embodied thereon a computer program for a method of recording data on a holographic storage medium, wherein the method comprises: concentrating modulated signal so that the angle of the modulated signal incident on the holographic storage medium is smaller in a radial direction, which is a scanning direction of a reference beam, than in a tangential direction perpendicular to the radial direction; and recording data on the holographic storage medium using the concentrated signal beam and the reference beam.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIGS. 1A and 1B are diagram to explain recording and reproduction modes in optical holography;

FIG. 2 is a diagram illustrating the angle of a signal beam according to each region when data is recorded on a holographic storage medium;

DETAILED DESCRIPTION OF THE EMBODIMENTS

Figure 3:
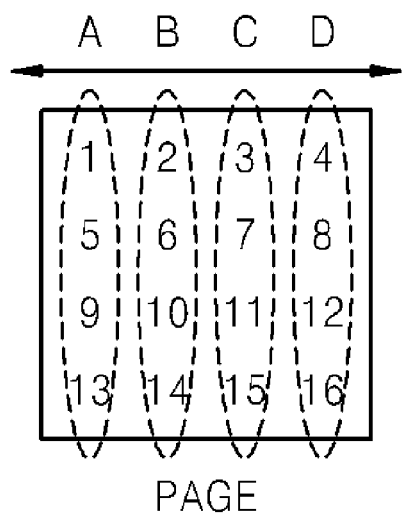
FIG. 3 is a diagram illustrating the region of a page divided into regions A, B, C, and D.
Figure 4:
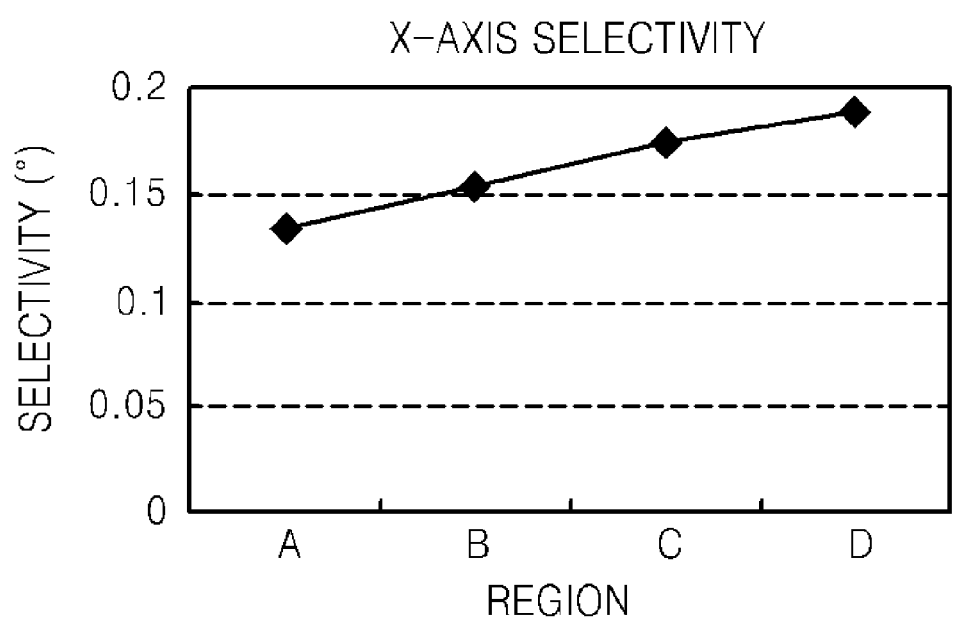
FIG. 4 is a graph illustrating the selectivity of a signal beam according to each region of the page of FIG. 3.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 5:
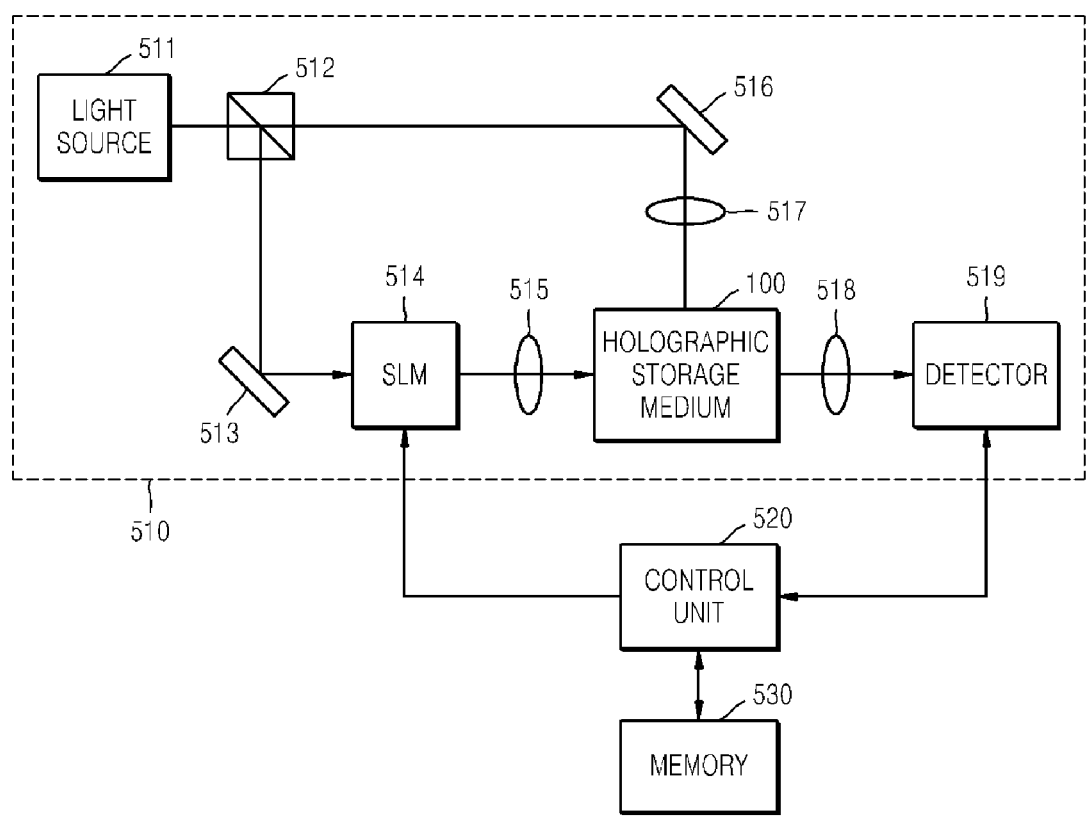
FIG. 5 is a block diagram of an apparatus to record data on a holographic storage medium according to an embodiment of the present invention.

FIG. 5 is a block diagram of an apparatus to record data on a holographic storage medium according to an embodiment of the present invention. Referring to FIG. 5, the apparatus includes a light processing unit 510 into which a holographic storage medium 100 is inserted, a control unit 520 to control the light processing unit 510 to record or reproduce data to or from the holographic storage medium 100, and a memory 530 to temporarily store data read out from the holographic storage medium 100 or temporarily store data to be recorded on the holographic storage medium 100. The light processing unit 510 includes a laser light source 511, a beam splitter 512, a first reflecting mirror 513, a spatial light modulator (SLM) 514, a first lens 515, a second reflecting mirror 516, a second lens 517, a third lens 518, and a detector 519.

The control unit 520 controls the light processing unit 510, produces a data page containing data, transmits the data page to the light processing unit 510, and processes a signal reproduced by the light processing unit 510. During a data recording mode, laser light having an interference characteristic output from the laser light source 511 is incident on the beam splitter 512 to be split into a reference beam and a signal beam. The signal beam is incident on the SLM 514, which displays the data, and is spatially modulated (amplitude modulated) by the SLM 514. The modulated signal beam is concentrated on the holographic storage medium 100 by the first lens 515. The reference beam is reflected by the second reflecting mirror 516 and is sent to the holographic storage medium 100 by the second lens 517. Accordingly, an interference pattern resulting from the superposition of the signal beam and the reference beam is recorded as a fine dense pattern on the holographic storage medium 100.

The SLM 514 of the light processing unit 510 may, although not necessarily, have a rectangular shape. A scanning direction of the reference beam can be determined according to a construction of the system. In other words, the scanning direction of the reference beam may be a radial direction or a tangential direction that is perpendicular to the radial direction. For convenience of description, the scanning direction of the reference beam is the radial direction in the current embodiment, though it is understood that other embodiments are not limited thereto. In particular, the SLM 514 is arranged so that an image formed on a surface of the SLM 514 is longer in a tangential direction than in a radial direction that is perpendicular to the tangential direction and is a scanning direction of the reference beam. Since selectivity varies according to each region of the SLM 514 in the radial direction, when the length of the image of the SLM 514 in the radial direction is reduced, a selectivity deviation is reduced and a distance between multiplexed data is reduced, thereby increasing a recording capacity of the holographic storage medium 100.

Figure 6:
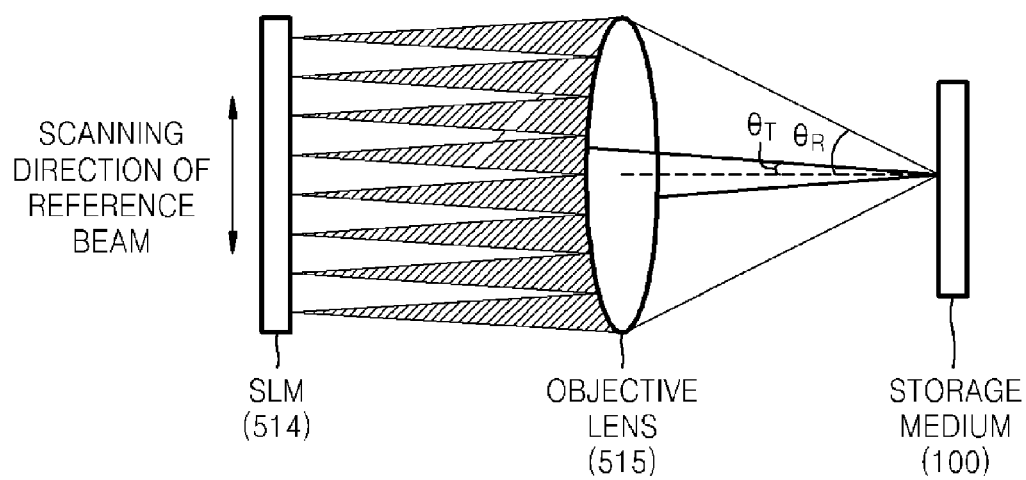
FIG. 6 is a diagram to explain a principle of forming a signal beam when data is recorded according to an embodiment of the present invention.

According to another embodiment of the present invention, data is recorded in such a manner that, when the signal beam modulated by the SLM 514 is incident on the holographic storage medium 100, the incident angle of the signal beam in the radial direction is less than the incident angle of the signal beam in the tangential direction that is perpendicular to the radial direction. FIG. 6 is a diagram to explain a principle of forming a signal beam when data is recorded according to an embodiment of the present invention. Referring to FIG. 6, a signal beam is modulated by the SLM 514, and concentrated on the holographic storage medium 100 by the first lens 515 (for example, an objective lens) so that an angle $\theta_R$ is less than $\theta_r$.

Figure 7:
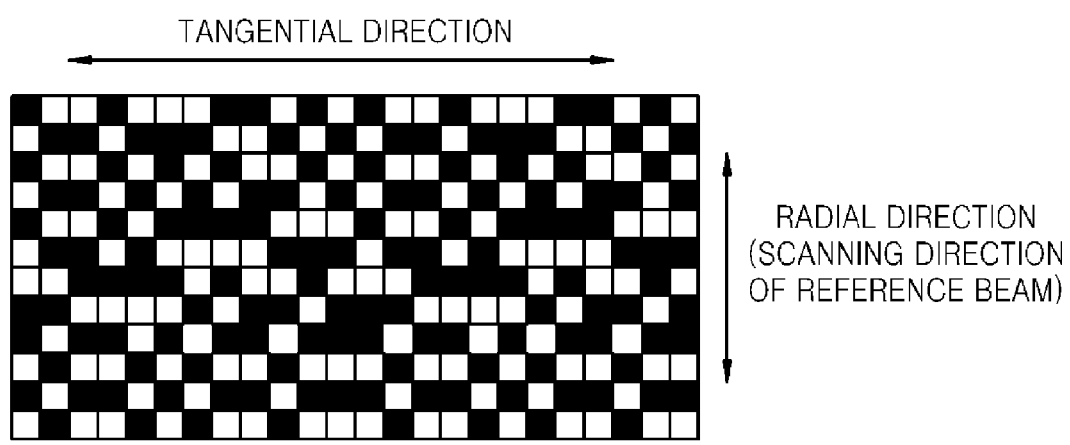
FIG. 7 is a diagram illustrating directions of a spatial light modulator (SLM) according to an embodiment of the present invention.
Figure 8:
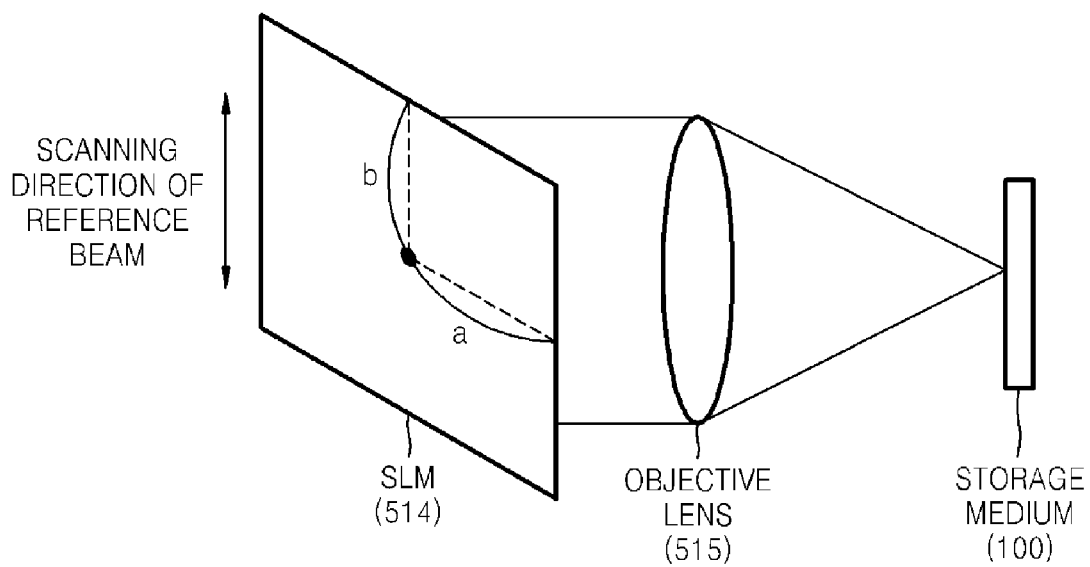
FIG. 8 is a diagram illustrating an arrangement of an SLM according to an embodiment of the present invention.

FIG. 7 is a diagram illustrating directions of the SLM 514 according to an embodiment of the present invention. A deviation of the incident angle of the signal beam modulated and concentrated on the holographic storage medium 100 can be reduced by properly arranging the SLM 514, thereby reducing selectivity. The SLM 514 may be a liquid crystal display (LCD) or a digital micromirror device (DMD). The signal beam passing through the SLM 514 is modulated into a page comprising a plurality of pixels. The SLM 514, which may have a rectangular shape, is arranged so that an image formed on a surface of the SLM 514 is longer in the tangential direction than in the radial direction that is perpendicular to the tangential direction and is the scanning direction of the reference beam. That is, the SLM 514 is arranged so that the image of the SLM is longer in the tangential direction than in the radial direction, as shown in FIG. 8. That is, the modulated signal beam passing through the SLM 514 has such a shape as shown in FIG. 7 by allowing a length "b" to be less than a length "a" in FIG. 8. For example, when the SLM is a 10 μm wide DMD with a pixel format of 1366×768, the SLM 514 may be arranged so that the shorter axis (768) of the DMD is located in the radial direction, thereby reducing the length of the image in the scanning direction of the reference beam.

Figure 9:
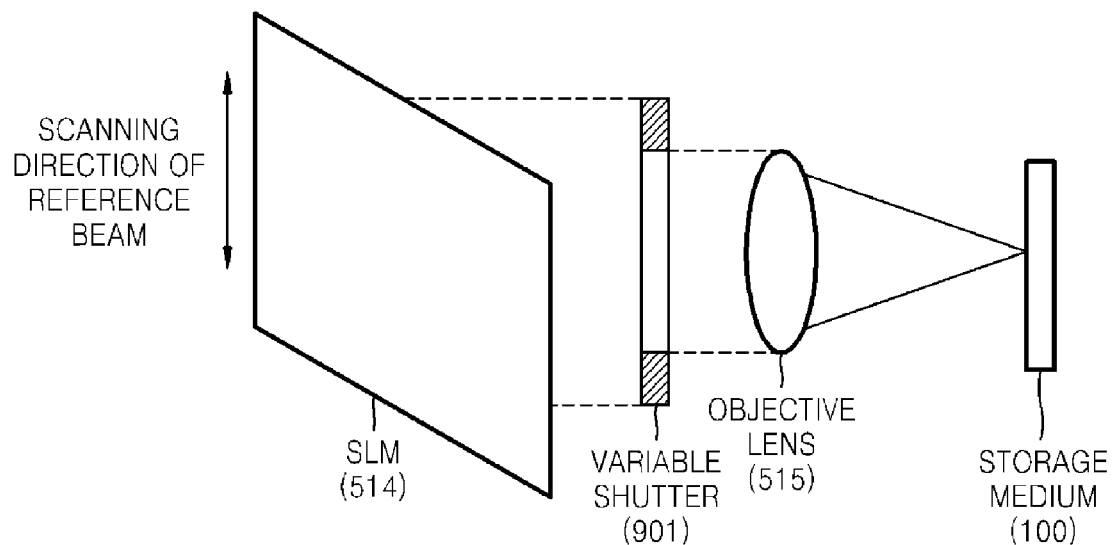
FIG. 9 is a diagram illustrating a light processing unit of an apparatus to record data on a holographic storage medium according to another embodiment of the present invention.

FIG. 9 is a perspective view illustrating a light processing unit 510 according to another embodiment of the present invention. Referring to FIG. 9, a variable shutter 901 is disposed between the first lens 515 (e.g., an objective lens) and the SLM 514. The variable shutter 901 blocks parts of the signal beam, which is modulated by the SLM 514, traveling from edges of the SLM 514 in the radial direction such that the parts of the signal beam do not pass through the objective lens 515. As a result, the incident angle of the modulated signal beam concentrated on the holographic storage medium 100 is less in the radial direction than in the tangential direction.

According to another embodiment of the present invention, the intensity of the signal beam can be adjusted by limiting the numerical aperture (NA) of the objective lens 515, which concentrates the signal beam, in the radial direction. In general, incident light is refracted outwardly unless the incident light is within a certain angle from a central axis. The NA is the sine of the maximum angle of the signal beam that is totally reflected and transmitted in the objective lens 515 without being refracted outwardly. The angle of the signal beam incident on the holographic storage medium 100 can be reduced by reducing the NA and reflecting the parts of the signal beam traveling from the edges in the radial direction. To this end, the first lens 515 may be a special lens such as a cylindrical lens, as opposed to a general spherical lens. The incident angle of the modulated signal beam concentrated on the holographic storage medium 100 can be smaller in the radial direction than in the tangential direction by controlling the NA.

Figure 10:
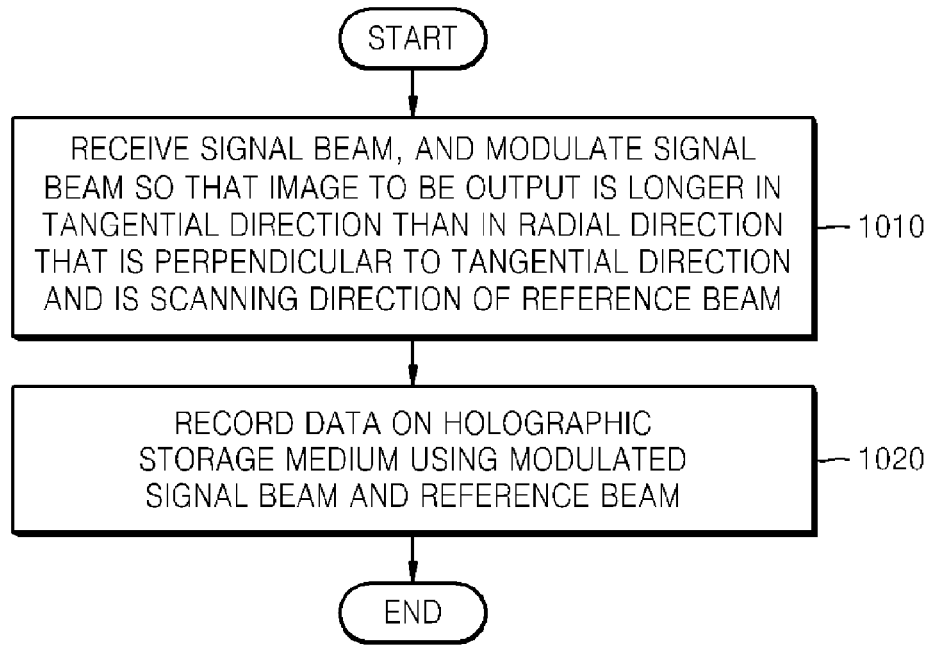
FIG. 10 is a flowchart illustrating a method of recording data on a holographic storage medium according to an embodiment of the present invention.

FIG. 10 is a flowchart illustrating a method of recording data on a holographic storage medium according to an embodiment of the present invention. Referring to FIG. 10, a signal beam is received and modulated in operation 1010 so that an image of an SLM is longer in a tangential direction than in a radial direction that is perpendicular to the tangential direction and is a scanning direction of a reference beam. In order to reduce a deviation of the angle of the signal beam incident on the holographic storage medium from the SLM in the radial direction, the length of the image in the radial direction is less than that in the tangential direction. If the SLM has a rectangular shape, the SLM may be arranged so that the shorter axis of the rectangular SLM is located in the radial direction. Also, the SLM may be realized whereby the length of the image of the SLM is shorter in the radial direction than in the tangential direction. Data is recorded on the holographic storage medium using the modulated signal beam and the reference beam in operation 1020.

Figure 11:
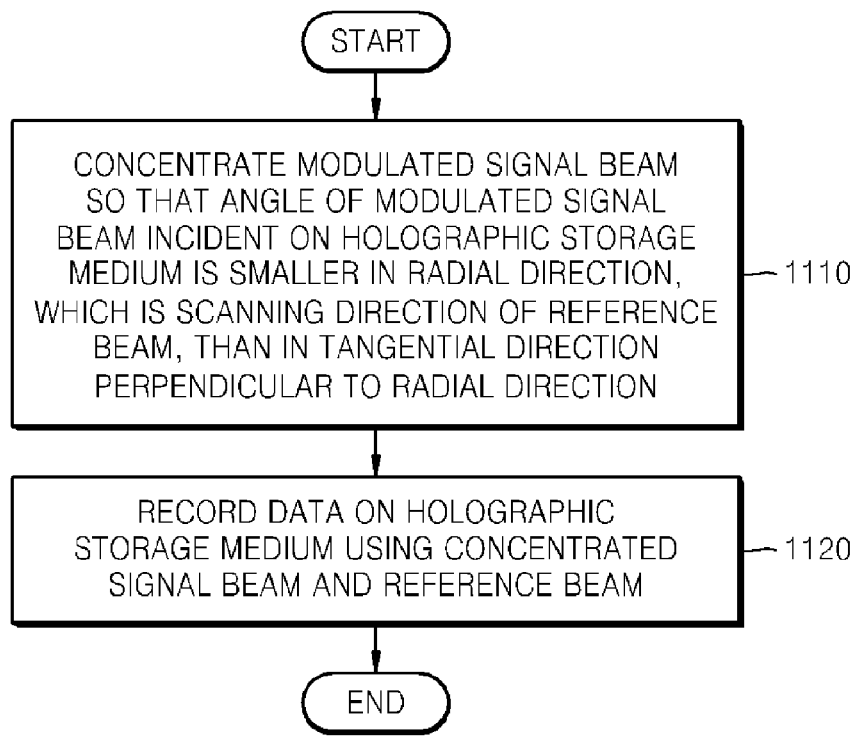
FIG. 11 is a flowchart illustrating a method of recording data on a holographic storage medium according to another embodiment of the present invention.

FIG. 11 is a flowchart illustrating a method of recording data on a holographic storage medium according to another embodiment of the present invention. Referring to FIG. 11, a modulated signal beam is concentrated so that the angle of the modulated signal beam incident on the holographic storage medium is less in a radial direction, which is a scanning direction of reference beam, than in a tangential direction perpendicular to the radial direction. In order to reduce the incident angle of the signal beam in the radial direction, a variable shutter 901 may be disposed between an objective lens 515 and an SLM 514 to block parts of the signal beam traveling from edges of the SLM in the radial direction. Alternatively (or additionally), the angle of the signal beam incident on a holographic storage medium may be reduced by reducing the NA of an objective lens that concentrates the signal beam on the medium and reflecting the parts of the signal beam traveling from the edges in the radial direction. Data is recorded on the holographic storage medium using the concentrated signal beam and the reference beam in operation 1120.

While not restricted thereto, aspects of the present invention may be embodied in a general purpose digital computer by running a program from a computer-readable medium. Examples of the computer-readable medium include storage media such as magnetic storage media (e.g., read only memories (ROMs), floppy discs, or hard discs), optically readable media (e.g., compact disk-read only memories (CD-ROMs), and digital versatile disks (DVDs)). Aspects of the present invention may also be realized as a data signal embodied in a carrier wave and comprising a program readable by a computer and transmittable over the Internet.

As described above, according to aspects of the present invention, a deviation of an incident angle of a signal beam in a direction in which a reference beam is incident can be reduced to record data at a high density. Furthermore, the high density data recording results in a high recording capacity and a high signal quality.

Although a few embodiments of the present invention have been shown and described, it would be appreciated by those skilled in the art that changes may be made in this embodiment without departing from the principles and spirit of the invention, the scope of which is defined in the claims and their equivalents.

The invention claimed is:

1. An apparatus to record data on a holographic storage medium, the apparatus comprising:
    a light processing unit to record the data on the holographic storage medium using a reference beam and a signal beam, the light processing unit comprising a light modulator to modulate the signal beam; and
    a control unit to control the light processing unit to record the data on the holographic storage medium,
    wherein the light modulator modulates the signal beam so that an image formed on a surface of the light modulator is shorter in a radial direction than in a tangential direction that is perpendicular to the radial direction, the radial direction being a scanning direction of the reference beam.

2. The apparatus as claimed in claim 1, wherein the light modulator is a rectangular spatial light modulator (SLM).

3. The apparatus as claimed in claim 1, wherein the light processing unit further comprises a variable shutter to block portions of the signal beam along one or both edges of the signal beam in the radial direction.

4. The apparatus as claimed in claim 1, wherein the light processing unit further comprises an objective lens to focus the modulated signal beam on the holographic storage medium, the objective lens having a predetermined numerical aperture (NA) to limit an angle of the modulated signal beam incident on the holographic storage medium in the radial direction.

5. The apparatus as claimed in claim 4, wherein the objective lens is a cylindrical lens.

6. The apparatus as claimed in claim 1, wherein the light processing unit further comprises:
    a variable shutter to block portions of the signal beam along one or both edges of the signal beam in the radial direction; and
    an objective lens to focus the modulated signal beam on the holographic storage medium, the objective lens having a predetermined numerical aperture (NA) to limit an angle of the modulated signal beam incident on the holographic storage medium in the radial direction.

7. The apparatus as claimed in claim 1, wherein the light modulator is shorter in the radial direction than in the tangential direction.

8. An apparatus to record data on a holographic storage medium, the apparatus comprising:
    a light processing unit to record the data on the holographic storage medium using a modulated signal beam and a reference beam; and
    a control unit to control the light processing unit to record the data on the holographic storage medium,
    wherein the light processing unit records the data so that an angle of the modulated signal beam incident on the holographic storage medium is smaller in a radial direction than in a tangential direction perpendicular to the radial direction, the radial direction being a scanning direction of the reference beam.

9. The apparatus as claimed in claim 8, wherein the light processing unit comprises a variable shutter to block portions of the signal beam along one or both edges of the signal beam in the radial direction.

10. The apparatus as claimed in claim 8, wherein the light processing unit comprises an objective lens to focus the modulated signal beam on the holographic storage medium, the objective lens having a predetermined numerical aperture (NA) to limit an angle of the modulated signal beam incident on the holographic storage medium in the radial direction.

11. The apparatus as claimed in claim 9, wherein the light processing unit further comprises an objective lens to focus the modulated signal beam on the holographic storage medium, the objective lens having a predetermined numerical aperture (NA) to limit an angle of the modulated signal beam incident on the holographic storage medium in the radial direction.

12. A method of recording data on a holographic storage medium, the method comprising:
    modulating, by a light modulator, a signal beam so that an image formed on a surface of the light modulator is shorter in a radial direction than in a tangential direction that is perpendicular to the radial direction; and
    recording the data on the holographic storage medium using the modulated signal beam and a reference beam,
    wherein the radial direction is a scanning direction of the reference beam.

13. The method as claimed in claim 12, wherein the light modulator is a rectangular spatial light modulator (SLM).

14. A computer-readable recording medium having embodied thereon a computer program encoded with the method of claim 12 and implemented by at least one computer.

15. A method of recording data on a holographic storage medium, the method comprising:
    concentrating a modulated signal beam so that an angle of the modulated signal beam incident on the holographic storage medium is smaller in a radial direction than in a tangential direction perpendicular to the radial direction; and
    recording the data on the holographic storage medium using the concentrated signal beam and a reference beam,
    wherein the radial direction is a scanning direction of the reference beam.

16. The method as claimed in claim 15, wherein the concentrating of the modulated signal beam comprises;
    concentrating the modulated signal beam so that the angle of the signal beam is smaller in the radial direction than in the tangential direction by blocking portions of the modulated signal beam along one or both edges of the signal beam in the radial direction.

17. A computer-readable recording medium having embodied thereon a computer program encoded with the method of claim 15 and implemented by at least one computer.

18. An apparatus to record data on a holographic storage medium, the apparatus comprising:

a light processing unit to record the data on the holographic storage medium using a reference beam and a signal beam so that the signal beam incident on the holographic storage medium is smaller in a radial direction than in a tangential direction perpendicular to the radial direction, the radial direction being a scanning direction of the reference beam.

19. A method of recording data on a holographic storage medium, the method comprising:

recording the data on the holographic storage medium by focusing a reference beam and a signal beam on the holographic storage medium so that the signal beam incident on the holographic storage medium is smaller in a radial direction than in a tangential direction perpendicular to the radial direction, the radial direction being a scanning direction of the reference beam.

* * * * *